No. 682,915. Patented Sept. 17, 1901.
F. F. CUMMS.
LEATHER WORKING MACHINE.
(Application filed Dec. 4, 1900.)
(No Model.) 6 Sheets—Sheet 2.
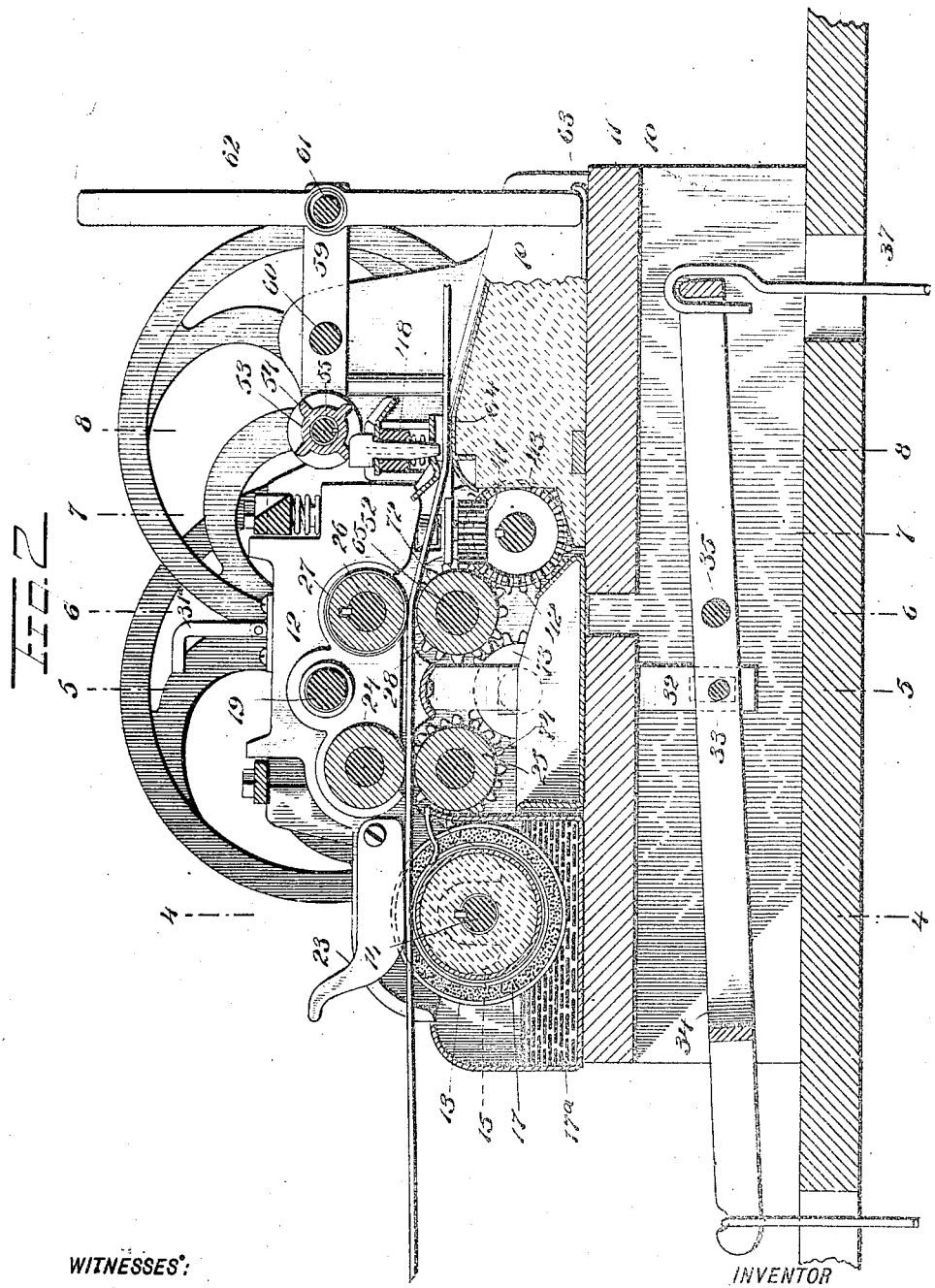
WITNESSES:
H. Walker
C. R. Ferguson
INVENTOR
Frank F. Cumms
BY
ATTORNEYS.

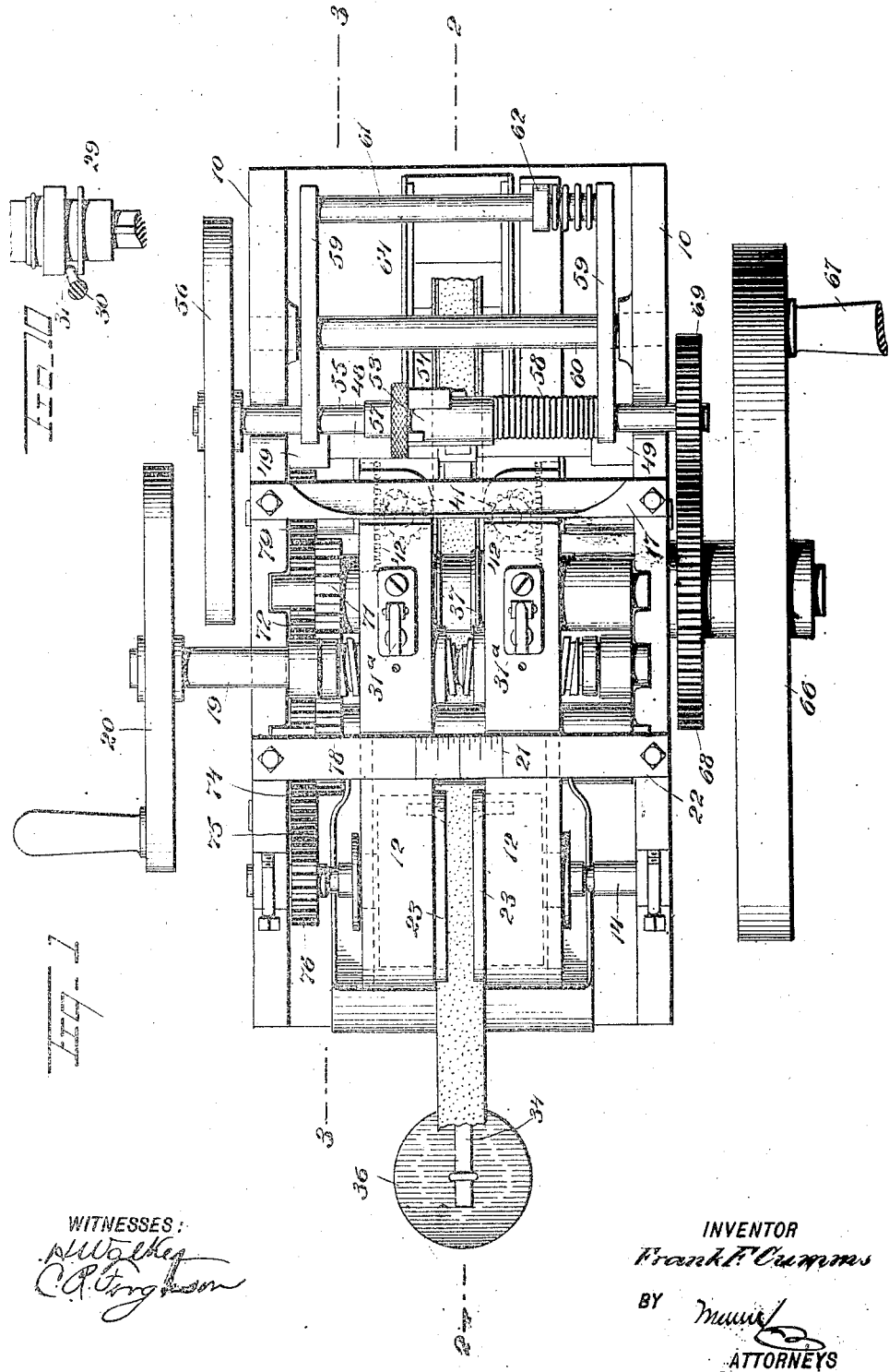

No. 682,915. Patented Sept. 17, 1901.
F. F. CUMMS.
LEATHER WORKING MACHINE.
(Application filed Dec. 4, 1900.)
(No Model.) 6 Sheets—Sheet 3.
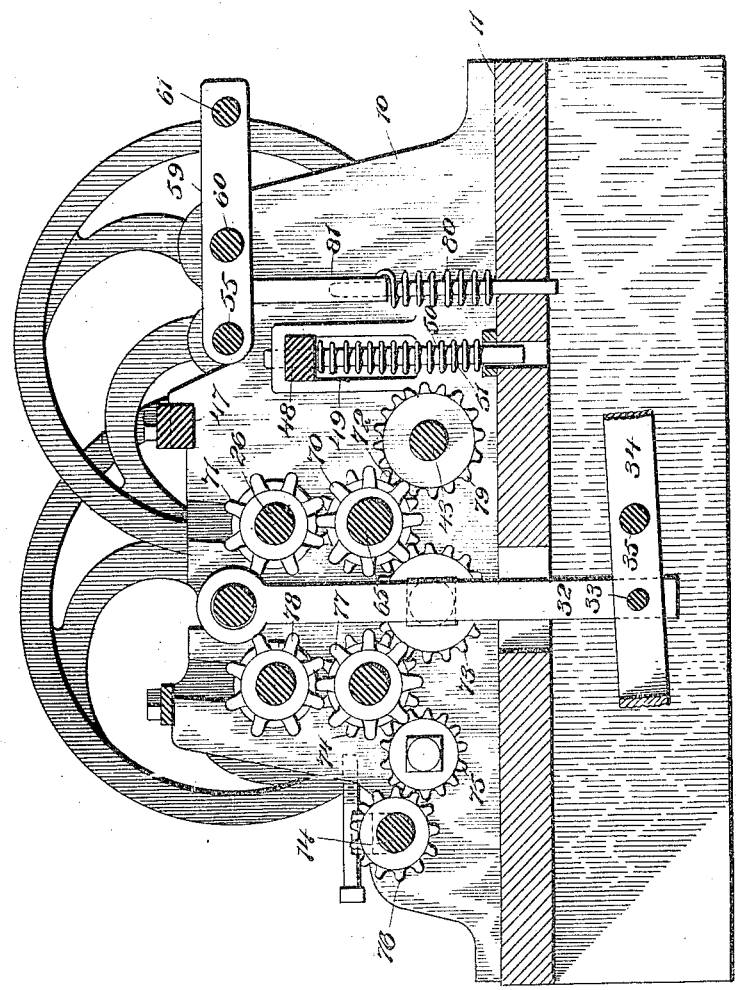
WITNESSES:
H. Walker
C. R. Ferguson
INVENTOR
Frank F. Cumms
BY
ATTORNEYS No. 682,915. Patented Sept. 17, 1901.
F. F. CUMMS.
LEATHER WORKING MACHINE.
(Application filed Dec. 4, 1900.)
(No Model.) 6 Sheets—Sheet 4.
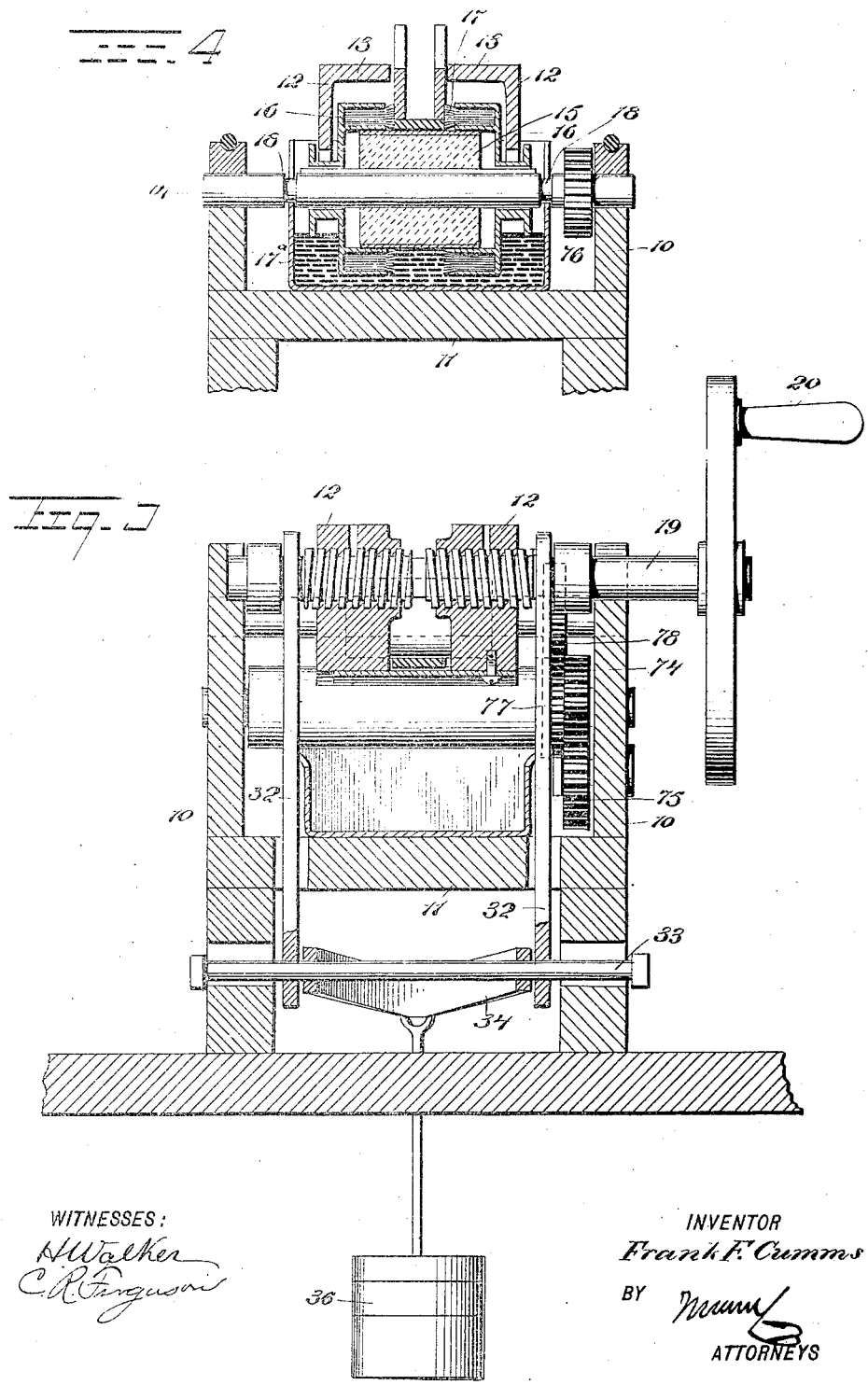
WITNESSES:
H. Walker
C. R. Ferguson
INVENTOR
Frank F. Cumms
BY
ATTORNEYS No. 682,915. Patented Sept. 17, 1901.
F. F. CUMMS.
LEATHER WORKING MACHINE.
(Application filed Dec. 4, 1900.)
(No Model.) 6 Sheets—Sheet 5.
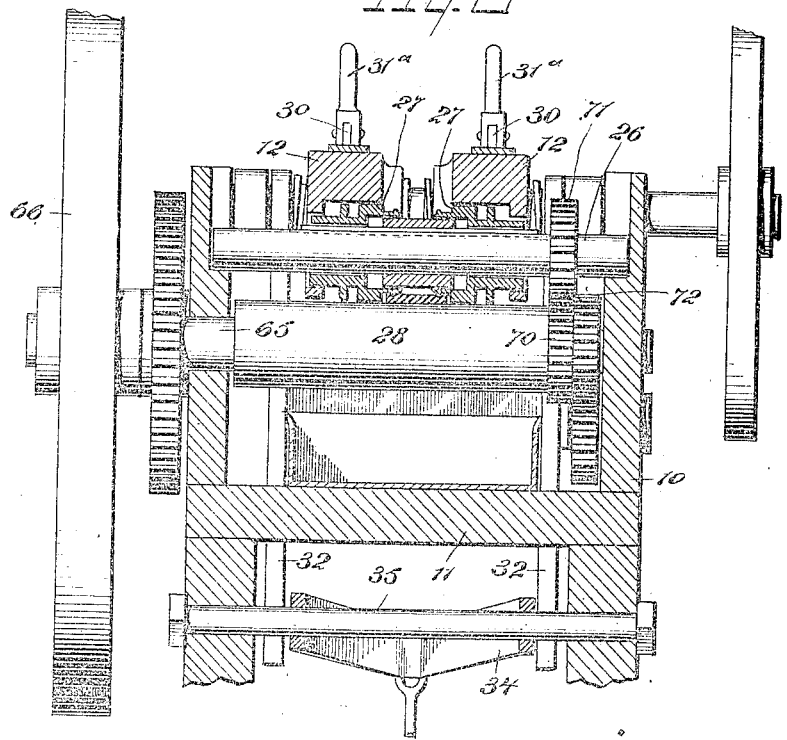
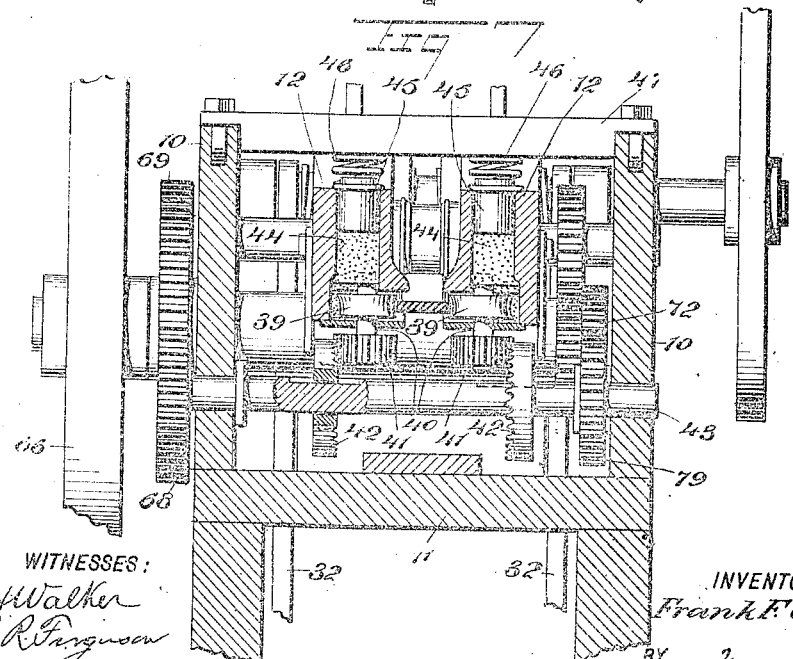
WITNESSES:
H. Walker
P. R. Ferguson
INVENTOR
Frank F. Cumms
BY
ATTORNEYS

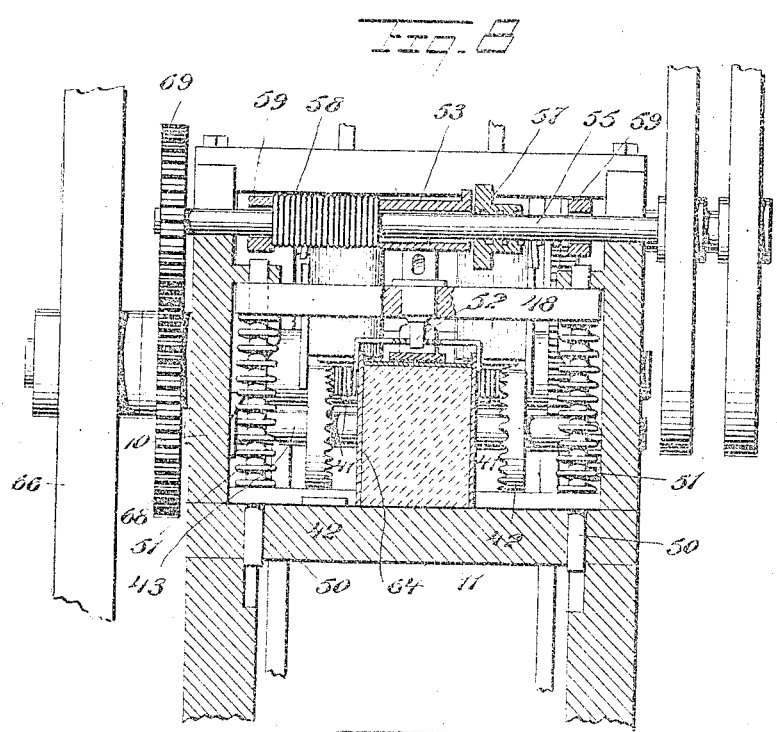
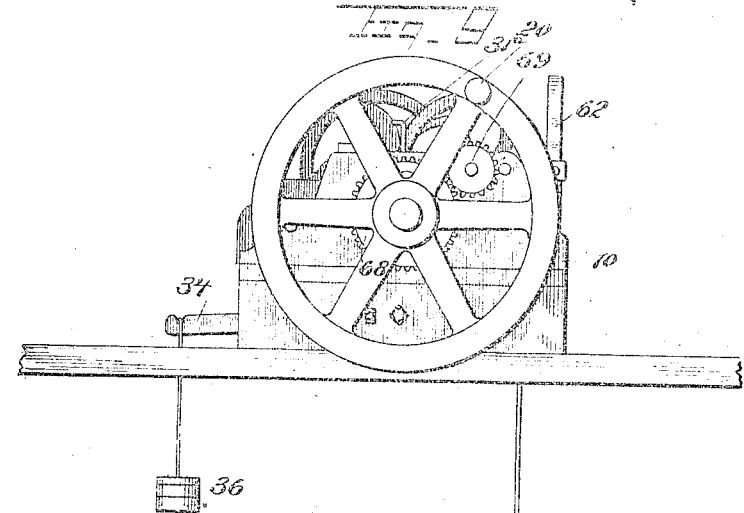

UNITED STATES PATENT OFFICE.

FRANK F. CUMMS, OF RUTLAND, VERMONT.

LEATHER-WORKING MACHINE.

SPECIFICATION forming part of Letters Patent No. 682,915, dated September 17, 1901.

Application filed December 4, 1900. Serial No. 38,668. (No model.)

*To all whom it may concern:*

Be it known that I, FRANK F. CUMMS, a citizen of the United States, and a resident of Rutland, in the county of Rutland and State of Vermont, have invented a new and Improved Leather-Working Machine, of which the following is a full, clear, and exact description.

This invention relates particularly to improvements in machines for finishing leather straps, reins, &c.; and the object is to provide a machine of simple construction operating to apply blacking to the edges of the strap, crease the surface, apply grease to the edges, and punch holes in the strap at desired distances apart.

I will describe a leather-working machine embodying my invention and then point out the novel features in the appended claims.

Reference is to be had to the accompanying drawings, forming a part of this specification, in which similar characters of reference indicate corresponding parts in all the figures.

Figure 1 is a plan view of a machine embodying my invention. Fig. 2 is a section on the line 2 2 of Fig. 1. Fig. 3 is a section on the line 3 3 of Fig. 1. Fig. 4 is a section on the line 4 4 of Fig. 2. Fig. 5 is a section on the line 5 5 of Fig. 2. Fig. 6 is a section on the line 6 6 of Fig. 2. Fig. 7 is a section on the line 7 7 of Fig. 2. Fig. 8 is a section on the line 8 8 of Fig. 2. Fig. 9 is a general side view of the machine, and Fig. 10 is a detail showing means for shifting the creasing-rollers.

The frame of the machine comprises side pieces 10, within which is a platform 11. Movable vertically in the fixed frame is a frame consisting of side pieces 12, having inwardly-extended top flanges 13. Arranged in the forward portion of the machine and having bearings in the side pieces 10 of the frame is a shaft 14, upon which is mounted a roller 15. Also mounted on the shaft 14, but adapted for longitudinal adjustment thereof, are brush-holders 16, which have inwardly-extended jaws within which the brush material 17 is arranged. These brush-holders rotate in a tank 17ª, designed to hold liquid blacking, the said tank being supported upon the platform 11, and the tank is held from lateral movement by having its side walls engaged in annular channels 18, formed in the shaft 14. The brush-holders on their outer sides have hub-like portions, which on the outer ends are provided with flanges, and engaging over these hub portions are the side pieces 12 of the vertically-movable frame, so that by adjusting the said side portions 12 toward or from each other the opposite brushes may be adjusted to accommodate them to different widths of straps.

As a means for causing the adjustments of the sides 12 I employ a shaft 19, which has bearings in the sides of the machine-frame and has right and left hand screw-threads engaging with correspondingly-threaded openings in the said sides 12. Obviously by rotating the shaft 19 by means of a crank-handle 20 the said side portions 12 will be moved toward or from each other, and the required distance may be ascertained by means of a scale 21 on a bar 22, extended across the machine. During the operation the edge of the strap is held down upon the roller 15 by means of weights 23, made in the form of levers, pivoted to the side pieces 12. Rearward of the brushes are feed-rollers 24 and 25. The roller 24 has its shaft-bearings in the vertically-movable frame, while the roller 25 has its shaft-bearings in the sides 10 of the machine-frame. Also having bearings in the vertically-movable frame is a shaft 26, on which creasing-rollers 27 are mounted, which are designed to rotate with the shaft, but are to have a movement longitudinally of the shaft, so as to move them toward or from each other to adjust them to the width of the strap under operation. Beneath the creasing-rollers is a bed-roller 28. The creasing-rollers are connected to the shaft 26 by feather and groove, and each creasing-roller is provided with a hub-like portion, in which is an annular channel 29. (See Fig. 10.) A shifting rod 30 has a finger 31 at its lower end engaging in this channel 29, and said rod extends upward through the inwardly-projected flange 13 of the side pieces 12, and pivotally connected to the upper projecting end of the rod 30 is an operating-lever 31ª, which at its end engaging with the rod is slightly rounded or cam-shaped, so as to engage tightly with the upper surface of the frame-sections 12 when the said levers are turned upward, as indicated in Fig. 6. When it is desired to move the creasing-rollers toward or from each other, the levers 31ª are to be moved downward to a substantially horizontal position, and then by turning them laterally a rotary motion will be imparted to the rods 30, which through the medium of the fingers 31 will move the creasing-rollers longitudinally of the shaft 26. When properly adjusted, the levers 31ª are to be moved to their vertical position to lock the rollers in their adjusted position. The vertically-movable frame is moved upward by means of posts 32, through which the shaft 19 loosely passes, and the lower ends of these posts are connected to a rod 33, which extends outward through openings in the side pieces 10 below the platform 11, and connecting with this rod 33 is a lever 34, consisting of two side members connected at the ends, the said side members being mounted to swing on a rod 35, connected to the main frame rearward of the rod 33. Suspended from the front end of the lever 34 is a weight 36, and from the other end of said lever 34 a rod 37 extends downward to a connection with a treadle 38. By forcing the treadle downward the frame comprising the side pieces 12 will be moved upward, so that a strap may be readily inserted between the feed-rollers.

Rearward of the creasing-rollers and adapted for engagement with opposite sides of the strap under operation are horizontally-rotating greasing-rollers 39. These greasing-rollers are mounted on shafts 40, having bearings in the frame 12, and on the lower ends of these shafts are pinions 41, which mesh with crown-wheels 42, attached to a shaft 43, having bearings in the frame members 10.

In the side portions 12 of the vertically-movable frame are openings 44, which form cups for holding grease. These cups at the lower end are provided with an opening through which the grease may pass to the rollers 39. The grease is forced downward by means of a plunger 45 operating in said cups and pressed upon by springs 46, the upper ends of which engage with a cross-bar 47. It will be seen that the pinions 41 are made quite wide, so that during the vertical movements of the frame 12 said pinions will not be disengaged from the crown-wheels. Rearward of the greasing-rollers is a punch-carrying bar 48, having its ends engaging in guides 49, attached to the inner sides of the side pieces 10, and extended downward from the ends of the punch-carrying bar 48 are rods 50, which pass freely through openings in the platform 11, and arranged between the upper side of this platform 11 and the under side of the bar 48 are cushion-springs 51, these springs 51 being coiled around the said rods 50. The center of the bar 48 is provided with an opening in which a punch 52 may be inserted. Of course a punch of any desired size may be employed.

As a means for forcing the punch downward with the carrying-bar I employ a tappet device, here shown as a sleeve 53, which is provided with a series of outwardly-extended cams or tappet-fingers 54. These tappet-fingers extend in varying lengths from one end of the sleeve 53, so that by adjusting the sleeve 53 longitudinally of the shaft 55, on which it is mounted, the said tappet-fingers may be brought into position to cause one or more of said fingers to engage with the punch during the rotation of the sleeve—that is, by moving the sleeve 53 to its extreme position toward a fly-wheel 56 on the shaft 55 the widest tappet-finger only will engage to operate the punch. Therefore the punch will be operated but once at each complete rotation of the shaft 55. Should it be desired to punch two holes closer together, the sleeve 53 is to be moved, so that not only the longer tappet-finger will engage with the punch, but the next longer tappet-finger will also engage with the punch. This will cause two movements of the punch during one rotation of the shaft. Obviously by moving the sleeve to its extreme position away from the fly-wheel 56 all of the tappets will be brought into position to operate the punch. The sleeve 53 is moved in one direction by means of a nut 57 engaging with a screw-thread on the shaft 55 and abutting at its end against one end of the sleeve 53. The sleeve is moved in the opposite direction when the nut is released or moved toward the fly-wheel by means of a spring 58, surrounding the shaft and engaging at one end with the end of said sleeve and at the other end with one of the arms 59, connected to the shaft 55. These arms 59 are for the purpose of raising or lowering the shaft 55 to move the punch into or out of operative position. These arms 59 are connected to a rock-shaft 60, having bearings in the frame members 10, and the outer ends of these arms 59 are connected by a cross-bar 61. Connected with the cross-bar 61 is a holding-lever 62, which has a portion extended upward to be engaged by a person to operate the arms or frame carrying the sleeve 53, and its lower end is designed to engage with a stop 63 on the platform 11 when the arms or frame is moved to bring the tappet device to operative position, as indicated in Fig. 2. Below the punch and inclined downward and rearward is a bed-plate 64, down which the material punched out will discharge. On the outer end of the shaft 65, on which the roller 28 is mounted, is a drive-wheel 66, that may be operated either by a suitably-driven band or may be manually operated by a crank-handle 67. On this end of the shaft 65 is a gear-wheel 68, which meshes with a gear-wheel 69, attached to the shaft 55. On the opposite end of the shaft 65 is a pinion 70, meshing with a pinion 71 on the shaft 26, and also on this shaft 65 is a pinion 72, engaging with an idler 73, which meshes with a pinion 74 on the shaft of the feed-roller 25, and this pinion 74 also meshes with an idler 75, engaging with a pinion 76 on the shaft 14. A pinion 77 on the shaft of the lower feed-roller meshes with a pinion 78 on the shaft of the upper feed-roller. It will be seen that these several pinions are arranged between one of the side members 12 of the vertically-movable frame and one of the side members 10 of the fixed frame. The pinion 72 also meshes with a pinion 79 on the shaft 43 for rotating the crown-wheels 42, and consequently operating the greasing-rollers. The frame or arms 59 when moved to their downward position are prevented from jar by means of cushion-springs 80, which engage at the lower end with the platform 11 and at their upper end with tubes or sleeves 81, against the upper ends of which the said arms 59 may strike. By the system of gearing it will be seen that the several rollers and brush-carrying devices will be rotated together.

In operation the vertically-movable frame is to be elevated by the means described and the end of the strap inserted between the feed-rollers 24 and 25. Then upon rotating the drive-shaft the several parts will be operated while the strap is moving through, so that blacking will be first applied to the edges of the strap, then the creases near the edges will be formed, and then the greasing-rollers will apply the grease to the edges, which will give the desired polish. If it is desired to punch holes through the strap at its end first passed through the machine, the punching device of course is to be brought into operation. When, however, it is not desired to punch holes, the shaft 55, carrying the tappet device, is to be elevated.

Having thus described my invention, I claim as new and desire to secure by Letters Patent—

1. A leather-working machine, comprising a frame, a tank for blacking arranged in said frame, circular brushes mounted to rotate through said tank and adjustable toward and from each other, and feed-rollers, substantially as specified.

2. A leather-working machine, comprising a frame, a tank for liquid blacking arranged in said frame, a shaft extended across the tank, circular brush-holders mounted on and adjustable longitudinally of said shaft, brush material in said holders, and a bed-roller mounted on said shaft between the brush-holders, substantially as specified.

3. In a leather-working machine, a frame, a tank for liquid blacking in said frame, a shaft extended across said tank, circular brushes mounted on said shaft and adjustable toward and from each other, a vertically-movable frame in said first-named frame, and having connection with the brushes, and means for moving the side portions of said vertically-movable frame toward and from each other to adjust the brushes, substantially as specified.

4. In a leather-working machine, a frame, blacking-brushes mounted to rotate in the forward portion of said frame, means for adjusting said brushes toward and from each other, feed-rollers rearward of said brushes, and creasing-rollers rearward of the feed-rollers, substantially as specified.

5. In a leather-working machine, blacking-applying brushes in the forward portion of the machine, feed-rollers rearward of said brushes, creasing-rollers rearward of the feed-rollers, means for adjusting said creasing-rollers toward and from each other, and grease-applying rollers rearward of the creasing-rollers, substantially as specified.

6. In a leather-working machine, a frame, blacking-applying brushes in the forward portion of said frame, creasing-rollers rearward of the brushes, and grease-applying rollers rearward of the creasing-rollers, substantially as specified.

7. In a leather-working machine, a frame, creasing-rollers mounted in said frame, grease-applying rollers adjacent to the creasing-rollers, and a punching device adjacent to the grease-applying rollers, substantially as specified.

8. In a leather-working machine, a frame, blacking-applying brushes in the forward portion of said frame, a vertically-movable frame in the first-named frame, a feed-roller carried by the vertically-movable frame, a feed-roller in the first-named frame below the first-named feed-roller, creasing-rollers carried by the vertically-movable frame, grease-applying rollers carried by the vertically-movable frame, and means operated by a treadle for raising said vertically-movable frame, substantially as specified.

9. In a leather-working machine, rollers for applying grease to the edges of a strap passed through the machine, means for imparting rotary motion to said rollers, and grease-boxes for supplying grease to said rollers, substantially as specified.

10. A leather-working machine, comprising a frame, blacking-applying brushes in the forward portion of said frame, feed-rollers rearward of said brushes, creasing-rollers rearward of the feed-rollers, grease-applying rollers rearward of the creasing-rollers, and means for simultaneously operating all the rollers and brushes, substantially as specified.

11. In a leather-working machine, a frame, a shaft mounted in said frame, creasing-rollers mounted to rotate on said shaft but adjustable longitudinally thereof, vertically-extended adjusting-shafts having fingers engaging in channels formed in the hubs of the creasing-rollers, and locking and turning levers pivotally connected to the upper ends of said adjusting-shafts, substantially as specified.

12. In a leather-working machine, a fixed frame, a vertically-movable frame in the fixed frame, the slide members of said vertically-movable frame being movable toward and from each other, a screw-shaft for causing said movements, a shaft in the forward portion of the fixed frame, brushes mounted to rotate with said shaft but adjustable longitudinally thereof, the said adjustments being caused by the movements of the side members of the vertically-movable frame, a feed-roller carried by the vertically-movable frame, creasing-rollers carried by the vertically-movable frame, and means for causing the vertical movements of the frame, substantially as specified.

13. In a leather-working machine, a frame, blacking-applying brushes in the forward portion of said frame, feed-rollers rearward of the blacking-applying brushes, creasing-rollers rearward of the feed-rollers and adjustable toward and from each other, grease-applying rollers rearward of the creasing-rollers, a punch arranged in the frame, means for operating said punch, and means for regulating the operations of said punch, substantially as specified.

14. In a leather-working machine, a fixed frame, a frame arranged in the fixed frame, the side walls of which are adjustable toward and from each other, a shaft arranged in the forward portion of the fixed frame, brush-carriers mounted to rotate with said shaft, the said carriers having connection with the adjustable frame members, and a punching device adjacent to the brush-carriers, substantially as specified.

15. In a leather-working machine, a fixed frame, a vertically-movable frame in the fixed frame, a shaft in the forward portion of the fixed frame, brush-carriers mounted to rotate with said shaft but movable longitudinally thereof, strap-holding devices pivotally connected to the vertically-movable frame, creasing-rollers in the frame, and a punch device in the frame, substantially as specified.

In testimony whereof I have signed my name to this specification in the presence of two subscribing witnesses.

FRANK F. CUMMS.

Witnesses:
WALTER C. LANDON,
WILLIAM H. SPAULDING.